(12) United States Patent
Anderson et al.

(10) Patent No.: US 6,850,337 B1
(45) Date of Patent: Feb. 1, 2005

(54) METHODS AND ARRANGEMENT FOR PROVIDING AND USING PRINTER CONFIGURATION STATUS INFORMATION

(75) Inventors: James E. Anderson, Meridian, ID (US); Rich Forcier, Nampa, ID (US); Robert E. Pentecost, Boise, ID (US); Kris R. Livingston, Boise, ID (US); Mark Muguira, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/495,089

(22) Filed: Jan. 31, 2000

(51) Int. Cl.[7] .............. G06F 3/12; G06F 13/00; G06K 15/02
(52) U.S. Cl. ............. 358/1.15; 358/1.12; 358/1.14
(58) Field of Search .............. 358/1.15, 1.14, 358/1.13, 1.16, 1.18, 1.6, 1.2, 402, 437, 438, 439, 501, 401, 406; 709/224, 228; 710/1–8; 11/19, 46, 9.06; 271/9.05; 399/81; 355/408; 347/221

(56) References Cited

U.S. PATENT DOCUMENTS

| | | | |
|---|---|---|---|
| 4,302,098 A | 11/1981 | Kan et al. ................. 355/55 |
| 4,829,468 A | 5/1989 | Nonaka et al. ............ 364/900 |
| 4,947,345 A | 8/1990 | Paradise et al. ........... 364/519 |
| 5,031,116 A | 7/1991 | Shukunami et al. ........ 364/519 |
| 5,081,595 A | 1/1992 | Moreno et al. ............ 395/111 |
| 5,129,639 A | 7/1992 | DeHority ................. 270/1.1 |
| 5,133,048 A | * 7/1992 | Parsons et al. ............ 395/111 |
| 5,172,178 A | 12/1992 | Oushiden et al. .......... 355/311 |
| 5,245,368 A | 9/1993 | Farrell et al. ............. 358/401 |
| 5,305,020 A | * 4/1994 | Gibbons et al. ........... 347/177 |
| 5,327,526 A | 7/1994 | Nomura et al. ............ 395/115 |
| 5,371,837 A | 12/1994 | Kimber et al. ............. 395/114 |
| 5,377,016 A | 12/1994 | Kashiwagi et al. ......... 358/403 |
| 5,393,043 A | 2/1995 | Nitta ..................... 271/9 |
| 5,483,889 A | 1/1996 | Hoberock et al. .......... 101/232 |
| 5,511,150 A | 4/1996 | Beaudet et al. ............ 395/113 |
| 5,523,822 A | 6/1996 | Tsuda .................... 355/208 |
| 5,550,957 A | 8/1996 | Davidson, Jr. et al. ...... 395/114 |
| 5,574,551 A | 11/1996 | Kazakoff ................. 399/45 |
| 5,692,111 A | 11/1997 | Marbry et al. ............. 395/114 |
| 5,699,493 A | 12/1997 | Davidson, Jr. et al. ...... 395/114 |
| 5,706,411 A | * 1/1998 | McCormick et al. ........ 395/113 |
| 5,717,841 A | 2/1998 | Farrell et al. ............. 395/114 |
| 5,768,483 A | 6/1998 | Maniwa et al. ............ 395/114 |
| 5,774,356 A | 6/1998 | Hisatake et al. ........... 364/148 |
| 5,791,790 A | 8/1998 | Bender et al. ............. 400/61 |
| 5,905,906 A | 5/1999 | Goffinet et al. ............ 395/828 |
| 5,923,942 A | 7/1999 | Nuggehalli et al. ......... 399/389 |
| 6,480,209 B1 | * 11/2002 | Jin ...................... 345/843 |

* cited by examiner

*Primary Examiner*—Gabriel Garcia
*Assistant Examiner*—Douglas Tran (57) ABSTRACT

Methods and arrangements are provided for use in a printer and associated computer(s). The printer is configured to periodically and/or automatically detect when changes are being made to a print media supply tray and output/display the current configuration of the print media supply tray for use by the user and/or programs running on the computer. The current configuration of the print tray is determined using detectable mechanisms that are either hardware and/or software implemented. The configuration of the supply tray is displayed to the user via the printer display, a tray-mounted display, and/or though a graphical user interface (GUI) on the computer. The configuration is defined by at least the size and type of the print media associated with the supply tray.

22 Claims, 5 Drawing Sheets

METHODS AND ARRANGEMENT FOR PROVIDING AND USING PRINTER CONFIGURATION STATUS INFORMATION

RELATED APPLICATIONS

This Patent Application is related to patent application Ser. No. 9/495,153, filed Jan. 31, 2000, and titled "Methods and Arrangements for Improved Paper Handling Based on Printer Configuration Status.

TECHNICAL FIELD

The present invention relates to computers, and more particularly, to methods and arrangements for providing and using printer configuration status information to increase productivity of a printer coupled to one or more computers.

BACKGROUND

A typical office setting includes a plurality of networked computers that are configured to share resources over the network. For example, an office may include a local area network (LAN) that is configured to provide connectivity between several personal computers (PCs) and a laser printer. The laser printer is a shared resource. Each of the PCs can send a print job to the laser printer. Some networks may include the use of a print server to control access to the laser printer. The print server can interface with the PCs and the laser printer to provide enhanced printing services. For example, the print server may maintain a print queue that stores and/or forwards print jobs to the laser printer at a particular time or in a particular order.

When a typical laser printer is connected to the network, an administrator or other user installs the requisite printer driver software on the various machines that have access to the laser printer over the network. Once the proper software has been installed, then the user is further required to configure the printer, as appropriate, for the office requirements. Thus, for example, if the laser printer has a plurality of multiple-purpose print media supply trays/bins, then the user may need to manually configure the tray/bin to match the print media they're loading. This may require adjusting movable guides, setting switches, turning dials, and/or otherwise physically adjusting the print media supply mechanisms associated with the tray/bin. The user may also be required to manually input, for example, through a control panel on the printer, status information about the initial printer configuration. For example, the user may need to define the size and/or type of print media in each of the trays/bins.

It has been found, that many users do not complete such additional configuration steps. Instead, many users simply rely on the default printer configuration settings provided by the manufacturer. Default settings, for example, may define that each of the trays/bins is configured to supply "plain paper" type print media, having dimensions of 8½×11 inches. While such defaults may work just fine for most conventional office settings, should another print media be desired for a print job, then the user may be required to manually intervene with the print job to "trick" or otherwise "force" the printer to complete the print on a different media. Users often revert to such brute-force techniques because they are too busy or are otherwise not interested in reading and following the manuals provided with the laser printer. Most users simply want their printouts.

Indeed, configuring a conventional laser printer can be a daunting task, especially for users that are unfamiliar with the various codes, sizes, or types of print media that may be referred to by the printer manufacturer. Moreover, the user interface provided by the laser printer inputs/displays and printer driver software may further confuse the novice computer user.

Thus, there is a need for improved methods and arrangements for providing and using printer configuration status information to increase productivity of the user. Preferably, the improved methods and arrangements will increase the information provided to the user, while simplifying the process associated with initially configuring and subsequently reconfiguring the printer.

SUMMARY

The present invention provides methods and arrangements that provide and use printer configuration status information to increase productivity of the user. The various methods and arrangements increase the information provided to the user, and can be implemented to simplify the process associated with initially configuring and subsequently reconfiguring the printer.

The various methods and arrangements provided herein, can be advantageously configured to periodically and/or automatically detect when changes are being made to a print media supply tray and output/display the current configuration of the print media supply tray for use by a user and/or programs running on a computer. The current configuration of the print tray can be determined using detectable mechanisms that are either hardware and/or software implemented. The configuration of the supply tray can be displayed to the user via the printer display, a tray-mounted display, and/or though a graphical user interface (GUI) on the computer. This tends to maximize productivity by addressing the proper user where they are most likely located and through the instrument that they are most likely viewing.

The above stated needs and others are met, for example, by a method for use with a printer, in accordance with certain aspects of the present invention. The method includes selectively configuring at least one print media supply tray based at least on a print media size and a print media type, and automatically displaying current configuration status information about the print media supply tray, including the print media size and the print media type, whenever the print media supply tray is operatively modified in a detectable way.

Here, the print media supply tray may be selectively configured by causing at least a print media size detectable mechanism to be modified in a manner that corresponds to the print media size, and causing at least a print media type detectable mechanism to be modified in a manner that corresponds to the print media type. The print media size and print media type detectable mechanisms may be provided through the print media tray, a printer input panel and/or a print driver graphical user interface.

Automatically displaying current configuration status information about the print media supply tray can further include detecting the print media size and print media type detectable mechanisms and providing a resulting current configuration status information to a print media tray-mounted display, a printer display panel and/or the print driver graphical user interface.

Automatically displaying current configuration status information may also include determining when the print media supply tray is operatively modified by detecting at least one physical change associated with the print media supply tray. Here, for example, the physical change may be detected using the print media size detectable mechanism, the print media type detectable mechanism, a tray position detectable mechanism, and/or a print media present or available detectable mechanism.

A system is also provided, in accordance with certain further aspects of the present invention. The system includes at least one computer, and a printer that is operatively coupled to the computer. Here, the printer includes at least one print media supply tray that is selectively configurable based at least on a print media size and a print media type. The printer also includes at least one controller arranged to automatically update and output current configuration status information about the print media supply tray, including the print media size and the print media type, whenever the print media supply tray is operatively modified.

BRIEF DESCRIPTION OF THE DRAWINGS

A more complete understanding of the various methods and arrangements of the present invention may be had by reference to the following detailed description when taken in conjunction with the accompanying drawings, in accordance with certain exemplary embodiments of the present invention, wherein.

DETAILED DESCRIPTION

While the following detailed description refers to an exemplary computer network and a shared resource printer, it should be understood that the various methods and arrangements in accordance with the present invention are applicable to all types of computers, networks, direct connections, dedicated printers, laser printers, ink-jet printers, copiers, scan-to-copy devices, and the like.

Figure 1:
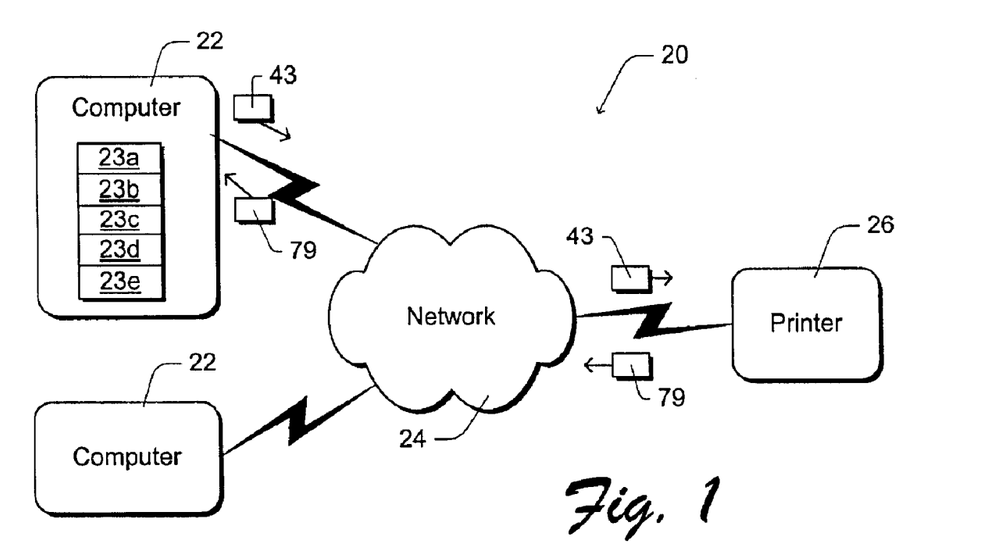
FIG. 1 is a block diagram depicting an exemplary computer network that is suitable for use with the present invention.

With this in mind, FIG. 1 depicts a computer network 20 having a plurality of computers 22 coupled to at least one communications network 24. Communication network 24 is further coupled to at least one printer 26. Computers 22 and printer 26 are configured to communicate with each other over communications network 24. By way of example, communications network 24 can include a local area network (LAN), or the like. Communications network 24 may also include a print server node (not shown). Computers 22 may include hand-held devices, multiprocessor systems, microprocessor-based or programmable consumer electronics, network PCs, minicomputers, mainframe computers, and the like.

For this discussion it is assumed that computers 22 are PCs and that printer 26 is a laser printer. As such, print jobs, for example, as generated in an application running on a PC, are directed from computer 22 over communication network 24 to printer 26.

As graphically depicted in FIG. 1, computer 22 can be operatively configured to generate print job data 43 by one or more instructions provided through an operating system 23a, at least one application 23b, a print driver installer program 23c, a print driver 23d (which may include initial installer instructions that eliminate the need for program 23c), a graphical user interface 23e, and/or other like programs. Print job data 43 is provided to printer 26 via communications network 24.

Printer 26 is configured, in this example, to provide printer configuration status data 79 to computer 22 via communications network 24. As described in more detail in the following sections, the printer configuration status data can be used within computer 22 and/or within printer 26 to provide programs and/or users with additional information about the current configuration of printer 26. This additional information can be used, for example, to reduce the potential for user confusion with respect to the current print media configuration of printer 26, alert the user of potential problems and/or the need to reconfigure printer 26, and enhance the operation of programs running within computer 22.

Figure 2:
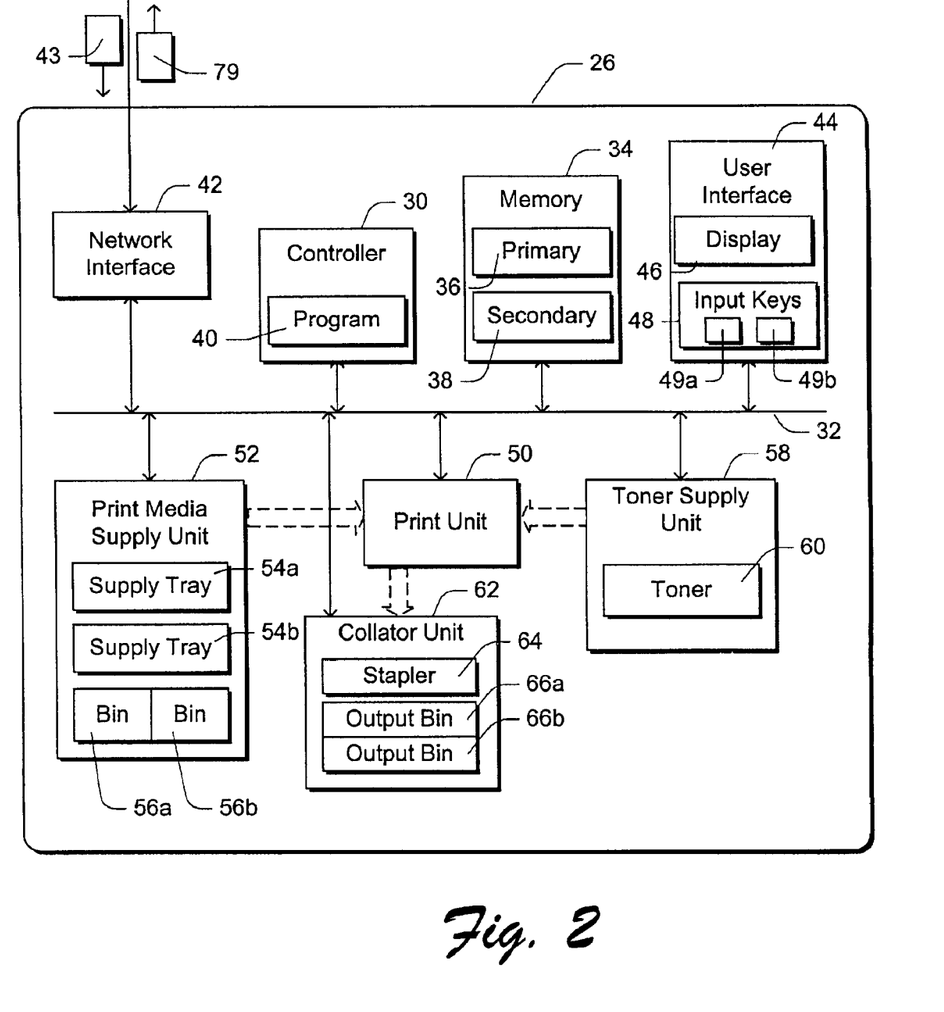
FIG. 2 is a block diagram depicting an exemplary printer for use in the computer network of FIG. 1, for example.

FIG. 2 depicts various exemplary functional subsystems within printer 26. As shown, printer 26 includes a controller 30 that is coupled to a bus 32. Controller 30 can include one or more processors, microprocessors or other like logic that is configured to control various operations within printer 26 and to format and/or otherwise process the print data as required. Bus 32 can include one or more data/control lines and associated circuitry, which are configured to provided communications between controller 30 and other subsystems within printer 26.

For example, a memory 34 is coupled to controller 30 via bus 32. Memory 34 can include any type of data storage. As depicted, memory 34 includes a primary memory 36 and a secondary memory 38. Primary memory 36 typically includes solid-state memory circuits such as, for example, a read only memory (ROM) and a random access memory (RAM). Primary memory 36 can include, for example, computer instructions associated with at least one program 40 designed to support the operation of controller 30. Primary memory 36 may also provide limited capacity for data buffering of a print job. In this example, secondary memory 38 represents a higher capacity data storage device, such as, for example, one or more flash memory circuits, a magnetic hard drive, a read/write optical disc drive, or the like. Preferably, secondary memory provides enough data storage to hold a plurality of variably sized print jobs.

A network interface 42 is also coupled to controller 30 and memory 34 via bus 32. Network interface 42 is configured to receive a print job 43 from computer 22 over communication network 24, for example. Network interface 42 can also output data through communication network 24 to computer 22. Print job 43 is passed through bus 32 to controller 30 and/or memory 34, as required. An exemplary print job 43 is further graphically illustrated in FIG. 3A, and described below in greater detail.

Referring again to FIG. 2, a user interface 44 is coupled to controller 30 via bus 32. User interface 44 is configured to provide information to a user and receive inputs from the user. Here, a display 46 (visual and/or audio) is depicted and configured to provide information about the operation of printer 26 to the user. Input keys 48 are also depicted and configured to allow the user to input information regarding printer operation and/or configuration to controller 30, for example.

A print unit 50 is depicted as being coupled to controller 30 via bus 32. Print unit 50 includes mechanisms that are arranged to selectively apply ink (e.g., liquid ink, toner, etc.) to a print media (e.g., paper, plastic, fabric, etc.) in accordance with print data within print job 43. Thus, for example, print unit 50 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy (heat) to the toner and pressure to the print media. Print unit 50 can also be configured to support duplex printing, for example, by selectively flipping or turning the print media as required to print on both sides. Those skilled in the art will recognize that there are many different types of print units available, and that for the purposes of the present invention print unit 50 can include any of these various types.

A print media supply unit 52 is coupled to controller 30 via bus 32, for example. Print media supply unit 52 includes mechanisms that are designed to selectively provide the requisite print media for a given print job 43 to print unit 50. In this example, print media supply unit 52 includes two supply trays 54a–b, and two supply bins 56a–b. Supply trays 54a–b are preferably configurable by the user to accept, store, and/or deliver various sizes and types of print media. Thus, for example, supply tray 54a may be manually or automatically configurable for letter size paper (8.5×11 inches), legal size paper (8.5×14 inches), executive size paper (7.25×10.5 inches), A4 size paper (8.27×11.69 inches), B5 size paper (7.17×10.12 inches), and/or other similar standard/custom sizes. Supply tray 54a may also be configurable for special types of print media, such as, for example, preprinted letterhead stock, transparent stock, pre-punched stock, colored stock, etc.

Supply tray 54b may be configured the same as supply tray 54a, or may be configured differently. For example, supply tray 54b may be configurable for larger print media, such as, ledger size paper (11×17 inches), A3 size paper (11.69×16.54 inches). Supply trays 54a–b may also provide for manual insertion of print media by the user. Supply bins 56a–b can be configured similar to supply trays 54a–b. Indeed, supply bins 56a–b may be included within a single supply tray. For the purposes of this example, it will be assumed that supply bins 56a–b are configured to hold different sized envelopes. Thus, for example, supply bin 56a may be configured to hold commercial #10 envelopes (4.1× 9.5 inches) and supply bin 56b may be configured to hold C5 size envelopes (6.4×9.1 inches).

Print media supply unit 52 is preferably configured to identify the size and possibly the type of print media provided/available from supply trays 54a–b and supply bins 56a–b. Consequently, controller 30 can be configured to make decisions regarding a particular print job based on the availability of the requisite print media.

A toner supply unit 58 is also coupled to controller 30 via bus 32. Toner supply unit 58 is configured to provide toner (ink) to print unit 50. As depicted in FIG. 2, toner supply unit 58 includes supply of toner 60. Toner 60 can include one or more colors/types of toner (ink) that can be selectively provided to print unit 50 as needed. Toner supply unit 58 may also be configured to provide information about toner 60 (e.g., availability, levels, etc.) to controller 30. Thus, controller 30 can be configured to make decisions regarding a particular print job based on the availability of the requisite toner.

An optional collator unit 62 is coupled to the controller 30 via bus 32. Collator unit 62 is configured to receive print media (post printing) from print unit 50 and to selectively control handling of the print media. Thus, for example, collator unit 62 includes a stapler 64 for stapling pages together, and output bins 66a–b for collecting and providing the completed print job to the user. Collator unit 62 may also be configured to provide information about stapler 64, or output bins 66a–b (e.g., empty, fill, blocked, etc.) to controller 30. Thus, controller 30 can be further configured to make decisions regarding a particular print job based ant the availability of the collator capabilities.

Figure 3A:
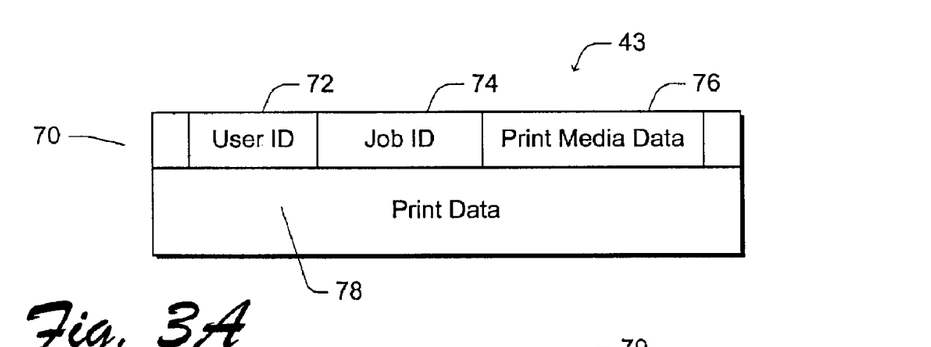
FIG. 3A is block diagram graphically depicting print job data for use in the computer network of FIG. 1, for example.

Reference is now made to the exemplary print job 43 graphically depicted in FIG. 3A. As shown, this exemplary print job 43 provides control data 70, which includes a user ID 72, a job ID 74, and print media data 76 to printer 26. Additionally, print job 43 includes the necessary print data 78 associated with the image to be printed on the print media. User ID 72 includes data that identifies the user who initiated print job 43. Thus, for example, user ID 72 can include a name of the user or a computer identifier number. Job ID 74 includes data that differentiates print job 43 from recent and near future print jobs. Thus, for example, a job sequence number may be included in job ID 74. Print media data 76 includes information regarding the requested or required size/type of print media to be used in completing the print job. Thus, for example, print media data 76 may indicate that a particular size paper is to be used, and/or that a particular type of print media is to be used for the print job. Consequently, controller 30 is responsive to all or part of control data 70 while processing print job 43.

Figure 3B:
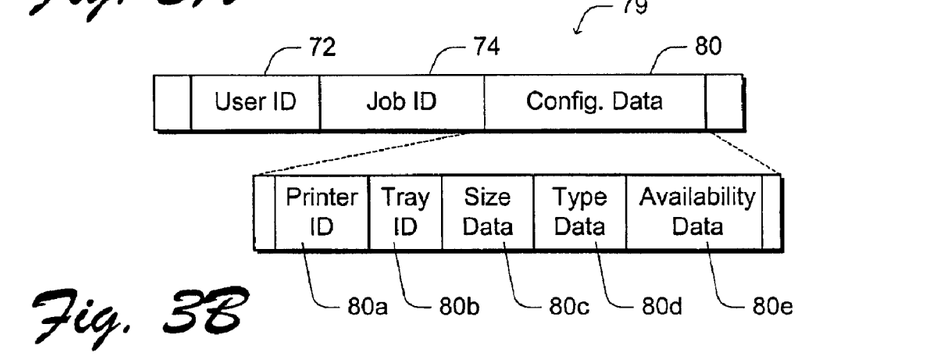
FIG. 3B is block diagram graphically depicting printer status configuration data for use in the computer network of FIG. 1, for example.

FIG. 3B graphically depicts exemplary printer configuration status data 79 generated by printer 26. In this example, user ID 72 and/or print job ID 74 may be combined or otherwise associated the current configuration data 80. In other examples, only configuration data 80 may be included. Configuration data 80 may include a printer ID 80a and additional information about the current configuration and/or status of printer 26. By way of example, configuration data 80 can include a print media supply tray identifier 80b associated with a particular supply tray/bin 54/56, print media size data 80c and print media type data 80d further identifying the print media configuration of the particular supply tray/bin 54/56, and print media availability data 80e identifying the availability of print media within the particular supply tray/bin 54/56.

Figure 4:
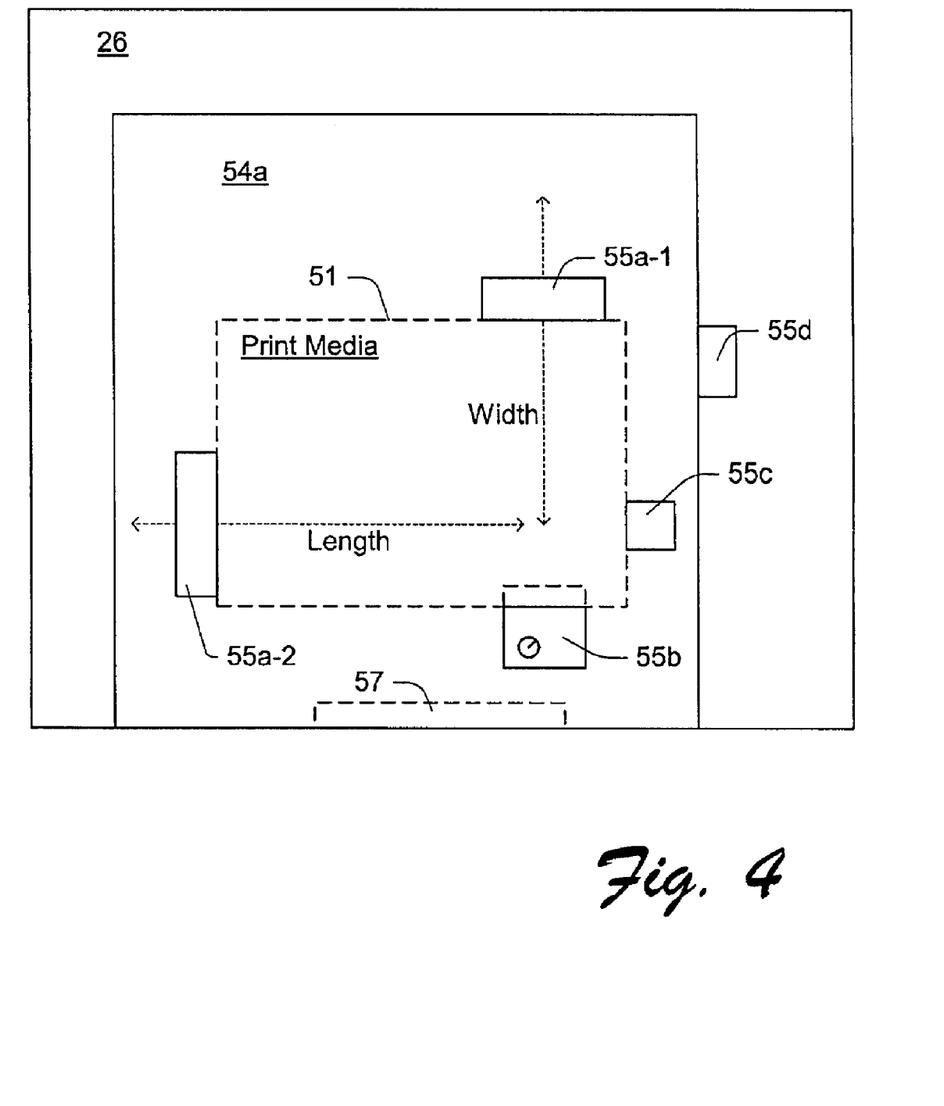
FIG. 4 is a block diagram depicting an exemplary print media tray arrangement for use in the printer of FIG. 2, for example.

FIG. 4 is a block diagram depicting an exemplary print media supply tray 54a within printer 26. As depicted, print media supply tray 54a is configurable to hold a plurality of sheets of print media 51.

Adjustable guides 55a-1 and 55a-2 are detectable mechanisms that are provided to define the width and length, respectively, of print media 51. For example, the user can mechanically move guides 55a-1 and 55a-2 during configuration/reconfiguration, and/or loading/unloading of the print media. The position or placement of guides 55a-1 and 55a-2 is detectable, for example, through mechanical and/or electrical sensors, by controller 30 or similar processing resources within print media supply unit 52. In this manner, controller 30, for example, is able to detect or otherwise determine print media size data 80c for print media supply tray 54a Those skilled in the art will recognize that other types of input devices, such as, for example, dials, etc., may be also be used to allow the user to selectively define the dimensions of print media 51.

The exemplary print media tray 54a further includes a print media type detectable mechanism 55b. Print media type detectable mechanism 55b may include, for example, a dial or other input device that allows the user to selectively define the type of print media within print media supply tray 54a. In certain implementations, print media type detectable mechanism 55b may include automatic sensors that are configured to detect the type of print media 51 within tray 54a. For example, one or more optical sensors may be employed to detect transparent or non-opaque print media, color media, pre-punched media (e.g., three-ring punched paper). Optical sensors may also be configured to identify pre-printed or other types of marked print media, for example, by contrast comparison of portions of the print media (e.g., infrared marked paper). Whether manual and/or automatic in operation, print media type detectable mechanism 55b is detectable, for example, by controller 30 or similar processing resources within print media supply unit 52. In this manner, controller 30, for example, is able to detect or otherwise determine print media type data 80d for print media supply tray 54a.

A print media present detectable mechanism 55c is configured to detect the presence and/or availability of print media 51 within tray 54a. Here, for example, print media present detectable mechanism 55c may be mechanically or electrically responsive in someway to the presence of print media 51. Print media present detectable mechanism 55c is detectable, for example, by controller 30 or similar processing resources within print media supply unit 52. In this manner, controller 30, for example, is able to detect or otherwise determine print media availability data 80d for print media supply tray 54a.

As shown, print media supply tray 54a is further associated with a tray position detectable mechanism 55d. Tray position detectable mechanism 55d is configured to be mechanically and/or electrically responsive to the movement and/or position of tray 54a. Thus, for example, if tray 54a is a drawer-operated type of tray, then tray position detectable mechanism 55d may detect when tray 54a is open and/or closed by the user. If, on the other hand, tray 54a is a shelf type of tray, then tray position detectable mechanism 55d may detect when tray 54a is being loaded and/or unloaded by the user. Tray position detectable mechanism 55d is detectable, for example, by controller 30 or similar processing resources within print media supply unit 52. In this manner, controller 30, for example, is able to detect or otherwise determine when the user is engaged in some form of manual intervention with print media supply tray 54a.

In accordance with certain aspects of the present invention, when the user is engaged in some form of manual intervention with printer 26, information about the current configuration of the printer and its subsystems may be useful to the user. Thus, in the example above, when the user is loading/unloading, or maybe just examining the contents of print media supply tray 54a, printer 26 is preferably configured to display at least a portion of the current configuration data 80 to the user. By way of example, controller 30 can provide tray ID 80b, size data 80c and type data 80d to printer display 46. Thus, as the user opens tray 54a (assuming it's a drawer), the current configuration of tray 54a is displayed on printer display 46. Consequently, the user will be quickly informed as to the configuration of tray 54a without having to take further actions. Controller 30 can be configured to return to the previously displayed data once the tray has been closed, or after a defined timeout period.

As an alternative or further enhancement, a tray-mounted display 57 can be included, for example, on a visible portion of tray 54a. Tray-mounted display 57 can, for example, include a liquid crystal display (LCD) or other similar display and associated controlling resources.

Referring back to FIG. 2, in certain implementations of the present invention, the size and type configuration of print media tray 54a may also (or alternatively) be set by the user via user interface 44. Here, for example, a print media size detectable mechanism 49a and a print media type detectable mechanism 49b may be provided through input keys 48 and/or printer display 46.

Similarly, in certain further implementations of the present invention, the size and type configuration of print media tray 54a are also (or alternatively) settable by the user via computer 22. Here, for example, print driver software 23d and/or graphical user interface 23e can be configured to accept user inputs, as necessary to remotely perform the functions of print media size detectable mechanism 49a and print media type detectable mechanism 49b. The resulting configuration information can then be provided to printer 26 via communications network 24.

Thus, there are a variety of ways to establish the configuration, or to reconfigure printer 26. Those skilled in the art will recognize that other similar arrangements can be employed to provide at least the same amount of detailed information to the user.

As described in the further exemplary methods as described below, printer configuration status data 80 is gathered, processed and portions of it displayed to user at critical times and in specific locations when, in the past, a typical user may not have been made aware or had knowledge of the current configuration of printer 26. In the above example, the user is made aware of the current configuration whenever print media supply tray 54a is physically changed in some detectable manner. This information about the tray, the media size and type settings are displayed either on the tray and/or through printer display 46. Thus, any user causing the detectable change will know what print media is to be loaded or reloaded into tray 54a, or if the tray needs to be reconfigured to support a particular print job.

Additionally, a user or program can receive current printer configuration status data 79 at various times to provide enhanced printing capabilities. Thus, for example, application 23b may be configured to receive current printer configuration status data 79 upon starting up, and/or upon accessing printer driver software 23d. Accordingly, if the user attempts to print a file that is incompatible with the current printer configuration status data 79, then application 23b and/or printer driver software 23d can preemptively alert the user that printer 26 is not currently configured to complete the print request. Graphical user interface 23e may be used to graphically or otherwise depict the printer and at least portions current printer configuration status data 79 in a manner that informs the user as to the manual intervention required to configure printer 26, as needed, to complete the print request.

If a print job has already been provided to printer 26, then current printer configuration status data 79 can be monitored or otherwise employed to alert the user to existing problems. For example, if print media 51 needs to be reloaded during processing of the print job, then the user can be alerted to the need for manual intervention. Moreover, unlike previous systems, only the user that sent the print job need be alerted to the problem. Thus, for example, the alert can be sent to the computer 22 associated with the user ID 72 and/or print job ID 74 as defined in current printer configuration status data 79.

Figure 5:
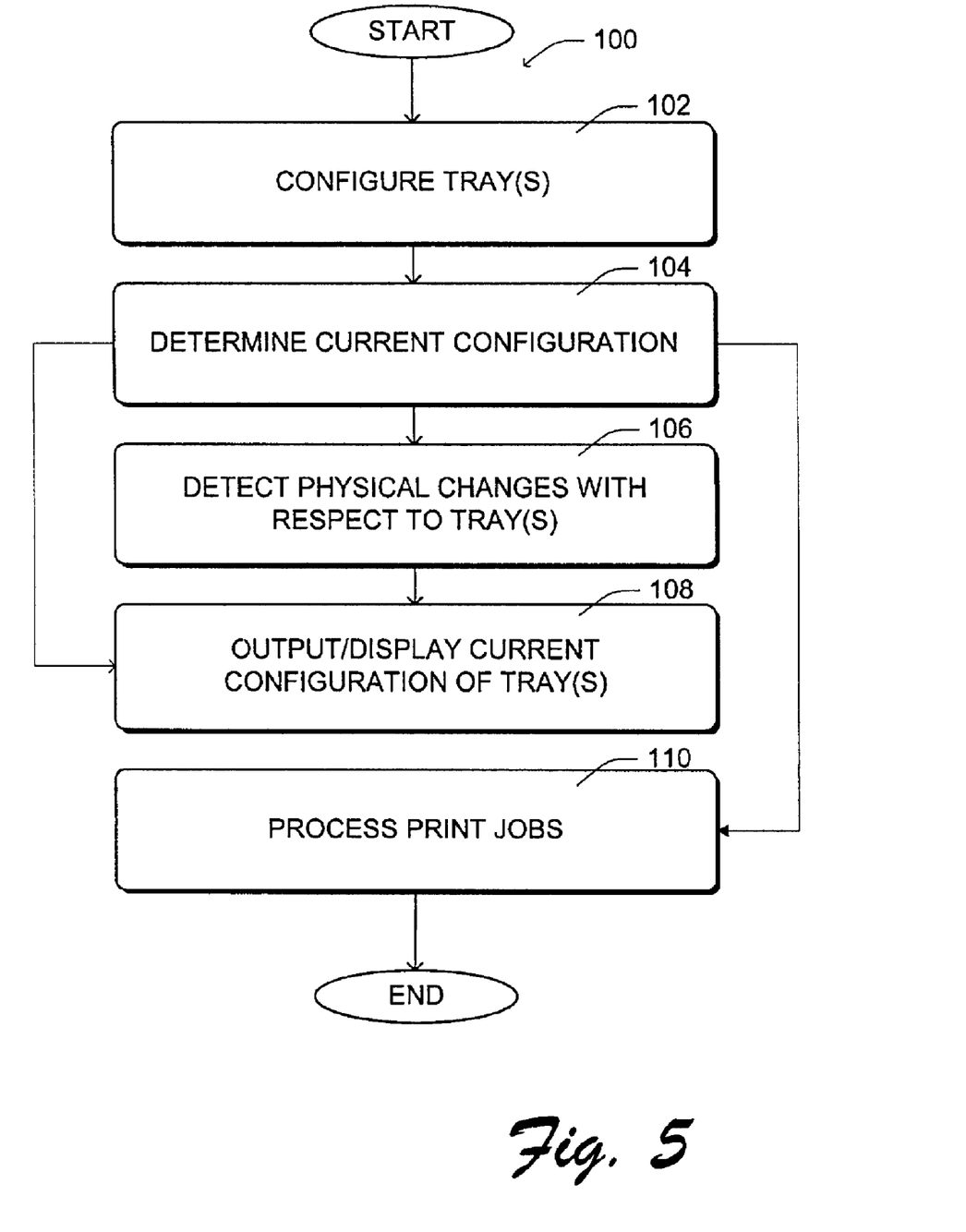
FIG. 5 is a flow-chart depicting an exemplary process for providing and using printer status configuration data during normal operation.

With these and other advantages in mind, FIG. 5 is a flow-chart depicting an exemplary process 100 for providing and using printer status configuration data during printing operations.

In step 102, at least one print media supply tray 54 is selectively configured based at least on a print media size and a print media type. This can include, for example, manually, automatically and/or remotely configuring print media supply tray 54.

In step 104, the current configuration status information about print media supply tray 54, including the print media size and the print media type, is determined using one or more detectable mechanisms. Current printer configuration status data 79 is generated in step 104 and provided as necessary to resources within printer 26 and/or computer 22.

Additionally, in step 102, a determination can be made within printer 26 and/or computer 22 to process a print job or print request, respectively. If a print request or print job cannot be met by the current printer configuration, then the appropriate user can be alerted per step 108, wherein at least portions of current printer configuration status data 79 is displayed to the user at either tray 54, printer 26, and/or computer 22. If the print request and/or print job can be met by the current printer configuration then the corresponding print job is completed as shown in step 10. If the print job fails to be completed, within step 10, the initiating user is alerted, as needed.

Here, a print job includes data to be printed and identifies at least one desired print media requirement within print media data 76. By way of further example, the print media requirement may include a print media type selection, a print media size selection, a print media marking selection, a simplex print selection, a duplex print selection, a print media post-processing selection, a print media availability selection, a print media supply tray selection, and/or a print media output tray selection.

In step 106, physical changes with respect to print media tray(s) 54 are detected using one or more detectable mechanisms. Thus, for example, if the user opens tray 54a or perhaps changes print media 51 in some detectable manner, then process 100 continues with step 108, wherein at least portions of current printer configuration status data 79 is displayed to the user at either tray 54 and/or printer 22.

Figure 6:
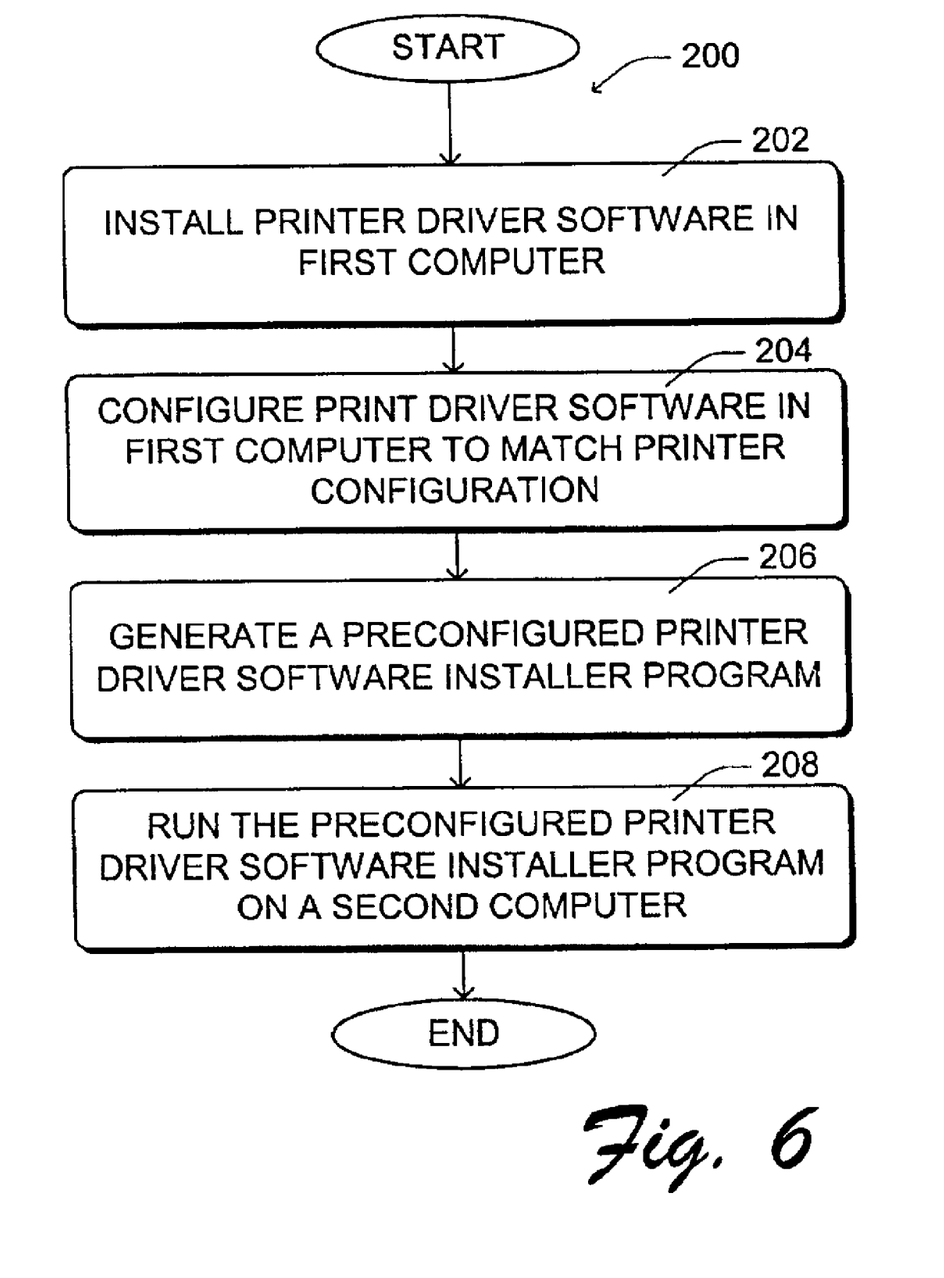
FIG. 6 is a flow-chart depicting an exemplary process for using printer status configuration data during the installation of printer driver software on a plurality of computers.

FIG. 6 is a flow-chart depicting an exemplary process 200 for using printer status configuration data 79 during the installation of printer driver software 23d on a plurality of computers 22.

Step 202 includes running print driver installer program 23c to initially install print driver software 23d on a first computer 22 that is coupled to printer 26 via communications network 24. In step 204, the user is prompted, for example, using graphical user interface 23e, as necessary to configure print driver software 23d to match the configuration of the print media supply tray 54 (as set, for example, in step 102) based at least on the print media size, the print media type, and, if applicable, a printer identifier and at least one print media supply tray identifier.

The initial installation of print driver software 23d may also include selectively configuring at least one output bin 66 to be operatively associated with at least one identifiable print job request parameter. This provides a "mailbox" like capability to printer 26 when possible. The print job request parameter can include a user identifier, a print job identifier, a print media type identifier, a print media size identifier, and the print media supply tray identifier.

In certain implementations, as depicted in step 206, process 200 further includes generating at least one print driver installer program for use with at least one other computer coupled to the printer. Here, the print driver installer program is prearranged to match the configuration of printer 26 based at least on the print media size, the print media type, and any related print media supply tray identifier(s). Consequently, subsequent operation of the print driver installer program, per step 208, on the other computer(s) will not require the user to provide further inputs with regard to the configuration of printer 26.

Although some preferred implementations of the various methods and arrangements of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method for use with a printer, the method comprising:
selectively configuring at least one print media supply tray based at least on a print media size and a print media type;
automatically displaying current configuration status information about the print media supply tray, including at least the print media size, when the print media supply tray is operatively modified with regard to at least the print media size;
wherein selectively configuring the print media supply tray further includes causing at least a print media size detectable mechanism to be modified in a manner that corresponds to the print media size, and causing at least a print media type detectable mechanism to be modified in a manner that corresponds to the print media type;
operatively preparing a print job request having data to be printed and identifying at least one desirable print media requirement; and
identifying if the current configuration status will prevent the print job from being completed based on at least one of the desired print media requirements, and, if so, alerting a user that the printer needs manual intervention to complete processing of the print job.

2. A method as recited in claim 1, wherein the print media size and print media type detectable mechanisms are provided via at last one component selected from a group comprising the print media tray, a printer input panel, and a print driver graphical user interface.

3. A method as recited in claim 1, wherein automatically displaying current configuration status information about the print media supply tray further includes detecting the print media size and print media type detectable mechanisms and providing a resulting current configuration status information to at least one component selected from a group comprising a print media tray display, a printer display panel, and a print driver graphical user interface.

4. A method as recited in claim 1, wherein automatically displaying current configuration status information about the print media supply tray further includes determining when the print media supply tray is operatively modified by detecting at least one physical change associated with the print media supply tray.

5. A method as recited in claim 4, wherein the at least one physical change associated with the print media supply tray is detected from a group of detectable mechanisms including the print media size detectable mechanism, the print media type detectable mechanism, a tray position detectable mechanism and a print media present detectable mechanism.

6. A method as recited in claim 1, further comprising operatively preparing a print job request using at least one application and a print driver in a computer coupled to the printer, the print job request having data to be printed and identifying at least one desired print media requirement selected from a group comprising a print media type selection, a print media size selection, a print media marking selection, a simplex print selection, a duplex print selection, a print media post-processing selection, a print media availability selection, a print media supply tray selection, and a print media output tray selection.

7. A method for use with a printer, the method comprising:
selectively configuring at least one print media supply tray based at least on a print media size and a print media type;
automatically displaying current configuration status information about the print media supply tray, including at least the print media size, when the print media supply tray is operatively modified with regard to at least the print media size;
operatively preparing a it job request using at least one application and a print driver in a computer coupled to the printer, the print job request having data to be printed and identifying at least one desired print media requirement selected from a group comprising a print media type selection, a print media size selection, a print media marking selection, a simplex print selection, a duplex print selection, a print media post-processing selection, a print media availability selection, a print media supply tray selection, and a print media output tray selection, and
identifying if the current configuration status will prevent the print job from being completed based on at least one of the desired print media requirements, and, if so, alerting the user that the printer needs manual intervention to complete processing of the print job.

8. A method as recited in claim 7, further comprising monitoring the current configuration status while processing the print job to determine if the print job cannot be completed based on at least one of the desired print media requirements, and, if so, alerting only the initiating user, via the print driver, that the printer needs manual intervention to complete processing of the print job.

9. A system comprising:
at least one computer;
a printer operatively coupled to the computer, the printer including at least one print media supply tray that is selectively configurable based at least on a print media size and a print media type, and at least one controller arranged to automatically update and output current configuration status information about the print media supply tray, including the print media size and the print media type, when the print media supply tray is operatively modified;
at least a print media size detectable mechanism arranged to be modified in a manner that corresponds to the print media size associated with the print media supply tray, and at least a print media type detectable mechanism arranged to be modified in a manner that corresponds to the print media type associated with the print media supply tray; and
wherein the controller of the printer operatively prepares a print job request having data to be printed and identifying at least one desirable print media requirement; and identifies if the current configuration status will prevent the print job from being completed based on at least one of the desired print media requirements, and, if so, alerting a user that the printer needs manual intervention to complete processing of the print job.

10. A system as recited in claim 9, wherein the print media size and print media type detectable mechanisms are provided via at least one component selected from a group comprising the print media tray, and a printer input panel.

11. A system as recited in claim 9, wherein the print media supply tray further includes a print media tray display, and the controller is further configured to detect the print media size and print media type detectable mechanisms and display current configuration status information via the print media tray display.

12. The system as recited in claim 9, wherein the printer farther includes a printer display panel, and the controller is further configured to detect the print media size and print media type detectable mechanisms and display current configuration status information via the printer display panel.

13. The system as recited in claim 9, wherein the computer further includes a display and a graphical user interface arranged on the display, and the controller is further configured to detect the print media size and print media type detectable mechanisms and provide current configuration status information to the computer, which is further configured to display at least a portion of the current configuration status information via the graphical user interface.

14. A system as recited in claim 10, wherein the printer is further configured to determine when the print media supply tray is operatively modified by detecting at least one physical change associated with the print media supply tray.

15. A system as recited in claim 14, wherein the printer further includes at least one additional detectable mechanism selected from a group of detectable mechanisms comprising a tray position detectable mechanism, and a print media present detectable mechanism, and the controller is further configured to detect the at least one physical change associated with the print media supply tray using the at least one additional detectable mechanism.

16. A printer for use with at least one computer, the printer comprising:
at least one print media supply tray that is selectively configurable based at least on a print media size and a print media type;
at least one controller arranged to automatically update and output current configuration status information about the print media supply tray, including the print media size and the print media type, when the print media supply tray is operatively modified;
wherein the printer further includes at least a print media size detectable mechanism arranged to be modified in a manner that corresponds to the print media size associated with the print media supply tray, and at least a print media type detectable mechanism arranged to be modified in a manner that corresponds to the print media type associated with the print media supply tray; and
wherein the at least one controller operatively prepares a print job request having data to be printed and identifying at least one desirable print media requirement; and identifies if the current configuration status will prevent the print job from being completed based on at least one of the desired print media requirements, and, if so, alerting a user that the printer needs manual intervention to complete processing of the print job.

17. A printer as recited in claim 16, wherein the print media size and print media type detectable mechanisms are provided via at least one component selected from a group comprising the print media tray, and a printer input panel.

18. A printer as recited in claim 16, wherein the print media supply tray further includes a print media tray display, and the controller is further configured to detect the print media size and print media type detectable mechanisms and display current configuration status information via the print media tray display.

19. A printer as recited in claim 16, wherein the printer further includes a printer display panel, and the controller is further configured to detect the print media size and print media type detectable mechanisms and display current configuration status information via the printer display panel.

20. A printer as recited in claim 16, wherein the controller is further configured to detect the print media size and print media type detectable mechanisms and provide current configuration status information to the computer.

21. A printer as recited in claim 17, wherein the printer is further configured to determine when the print media supply tray is operatively modified by detecting at least one physical change associated with the print media supply tray.

22. A printer as recited in claim 16, further comprising:

at least one additional detectable mechanism selected from a group of detectable mechanisms comprising a tray position detectable mechanism, and a print media present detectable mechanism and wherein the controller is further configured to detect the at last one physical change associated with the print media supply tray using the at least one additional detectable mechanism.

* * * * *

UNITED STATES PATENT AND TRADEMARK OFFICE
CERTIFICATE OF CORRECTION

PATENT NO.         : 6,850,337 B1                                     Page 1 of 1
APPLICATION NO. : 09/495089
DATED              : February 1, 2005
INVENTOR(S)        : Anderson et al.

It is certified that error appears in the above-identified patent and that said Letters Patent is hereby corrected as shown below:

In the Claims

Col. 10 (line 43), delete "last" and insert therefor --least--.

Col. 11 (line 18), delete "it" and insert therefor --print--.

Col. 12 (line 11), delete "farther" and insert therefor --further--.

Col. 14 (line 11), delete "last" and insert therefor --least--.

Signed and Sealed this

Twelfth Day of December, 2006

JON W. DUDAS
*Director of the United States Patent and Trademark Office*